US008934753B2

(12) United States Patent
Cheng

(10) Patent No.: US 8,934,753 B2
(45) Date of Patent: *Jan. 13, 2015

(54) METHOD FOR SYNCHRONIZING AUDIO PLAYBACK OF DIGITAL MEDIA RENDERS, AND RELATED DIGITAL MEDIA CONTROLLER, DIGITAL AUDIO MEDIA RENDER AND DIGITAL MEDIA SERVER

(71) Applicant: Primax Electronics Ltd., Taipei (TW)

(72) Inventor: Ting-Yuan Cheng, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 82 days.

This patent is subject to a terminal disclaimer.

(21) Appl. No.: 13/668,305

(22) Filed: Nov. 4, 2012

(65) Prior Publication Data

US 2013/0336626 A1    Dec. 19, 2013

(30) Foreign Application Priority Data

Jun. 18, 2012   (TW) .............................. 101121780 A

(51) Int. Cl.
   *H04N 5/932*           (2006.01)
(52) U.S. Cl.
   USPC ........... 386/201; 386/202; 386/203; 386/204; 386/207

(58) Field of Classification Search
   USPC ......................................... 386/201–204, 207
   See application file for complete search history.

(56) References Cited

U.S. PATENT DOCUMENTS

| 5,245,667 | A  * | 9/1993  | Lew ............................ 381/94.4 |
| 6,661,861 | B1 * | 12/2003 | Pianka et al. ................. 375/373 |
| 6,683,927 | B1 * | 1/2004  | Ito ................................ 375/355 |
| 2003/0118059 | A1 * | 6/2003  | Sugahara ....................... 370/535 |
| 2006/0098936 | A1 * | 5/2006  | Ikeda et al. .................... 386/46 |
| 2010/0077110 | A1 * | 3/2010  | Berreth ........................... 710/22 |
| 2011/0320214 | A1 * | 12/2011 | Pilati et al. ................... 704/500 |
| 2012/0140018 | A1 * | 6/2012  | Pikin et al. ................. 348/14.02 |

* cited by examiner

*Primary Examiner* — Helen Shibru
(74) *Attorney, Agent, or Firm* — Winston Hsu; Scott Margo

(57) ABSTRACT

An exemplary method for synchronizing audio playback of a plurality of digital media renders. The digital media renders include a digital audio/video (AV) media render and at least one digital audio media render. The method includes: detecting a relative time position difference between the digital AV media render and the at least one digital audio media render; and controlling audio playback of the digital audio media render to synchronize to audio playback of the digital AV media render according to the relative time position difference.

21 Claims, 13 Drawing Sheets

METHOD FOR SYNCHRONIZING AUDIO PLAYBACK OF DIGITAL MEDIA RENDERS, AND RELATED DIGITAL MEDIA CONTROLLER, DIGITAL AUDIO MEDIA RENDER AND DIGITAL MEDIA SERVER

BACKGROUND OF THE INVENTION

1. Field of the Invention

The disclosed embodiments of the present invention relate to audio playback, and more particularly, to a method for synchronizing audio playback of a plurality of digital media renders (DMRs) and related digital media controller, digital media server, and digital audio media player.

2. Description of the Prior Art

An industrial standard of mutual connection and mutual adaption of products of distinct manufacturers for providing digital living to consumers is achieved by the Digital Living Network Alliance (DLNA). The DLNA specification is also employed by a home digital audio and video media playback system including a digital media controller (DMC), a digital media server (DMS), and a plurality of digital media renders (DMRs). However, in a case where the DMRs, the DMS and the DMC are connected via wireless means, the DMRs receive audio data from the DMS for audio playback by way of wireless connection. The advantages include the simplified wired configuration and improved flexibility for future equipment update. However, the disadvantage is that the wireless transmission has poorer stability when compared with the wired transmission. The DMRs may be asynchronous to each other apparently at the initial condition of the playback or during the playback as the system is subject to interference. The DMRs may also be gradually asynchronous to each other under a stable connection due to a slight difference between DMRs' oscillator frequencies. Therefore, how to control and synchronize a plurality of DMRs has become a significant concern in this field.

Regarding the conventional synchronization design of DMRs, an absolute timing concept is employed. Specifically, each DMR may have information with absolute timing to comply with. However, many systems, including the DLNA systems, do not offer information about absolute timing due to simplified system designs. As a result, the conventional synchronization design cannot be employed by these systems. Therefore, there is a need for an innovative design which can synchronize a plurality of DMRs.

SUMMARY OF THE INVENTION

In accordance with exemplary embodiments of the present invention, a method for synchronizing audio playback of DMRs and related apparatuses are proposed to solve the above-mentioned problem.

According to a first aspect of the present invention, an exemplary method of synchronizing audio playback of a plurality of digital media renders (DMR) is disclosed. The DMRs include a digital audio/video (AV) media render and at least one digital audio media render. The method includes: detecting a relative time position difference between the digital AV media render and the digital audio media render; and controlling audio playback of the digital audio media render to be synchronous to audio playback of the digital AV media render according to the relative time position difference.

According to a second aspect of the present invention, an exemplary digital media controller (DMC) for synchronizing audio playback of a plurality of DMRs is disclosed. The DMRs include a digital AV media render and at least one digital audio media render. The exemplary DMC includes a detecting circuit and a control circuit. The detecting circuit is arranged for detecting a relative time position difference between the digital AV media render and the digital audio media render. The control circuit is coupled to the detecting circuit, arranged for controlling audio playback of the digital audio media render to be synchronous to audio playback of the digital AV media render according to the relative time position difference.

According to a third aspect of the present invention, an exemplary digital audio media render is disclosed. The exemplary digital audio media render includes an audio playback adjusting circuit and a control circuit. The control circuit is arranged for receiving a mismatching relative time position from a DMC, and controlling the audio playback adjusting circuit according to the mismatching relative time position, thereby to allow the audio playback of the digital audio media render synchronous to the audio playback of the digital AV media render, wherein the mismatching relative time position corresponds to a relative time position difference between the digital audio media render and the digital AV media render.

According to a fourth aspect of the present invention, an exemplary digital media server (DMS) is disclosed. The exemplary DMS includes a package processing circuit and an audio playback adjusting circuit. The package processing circuit is arranged for generating audio packages. The audio playback adjusting circuit is arranged for receiving a control signal derived from a DMC to adjust the audio packages provided to the DMR.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

In a digital media playback system, a plurality of digital media renders (DMRs) may include a digital audio/video (AV) media render (e.g., a digital versatile disc (DVD) player) or at least one digital audio media render (e.g., a home theater or a 5.1 channel speaker system). In general applications, only one video render is adopted for video playback, while more than one audio render is utilized for audio playback. In some advanced applications, multiple audio renders may be integrated, or even be controlled by a digital media controller (DMC) which can transmit a digital audio data or a digital video data from a digital media server (DMS) to at least one digital audio media render and the digital AV media render through wireless communication for instant playback. The synchronization between the digital AV media render and the digital audio media render is difficult to maintain stable due to the instability during the wireless transmission or the instability of an initial condition of the wireless transmission. Therefore, timing related information has to be utilized directly or indirectly to monitor the status of synchronization and correct the synchronization issue in a real-time manner.

Figure 1:
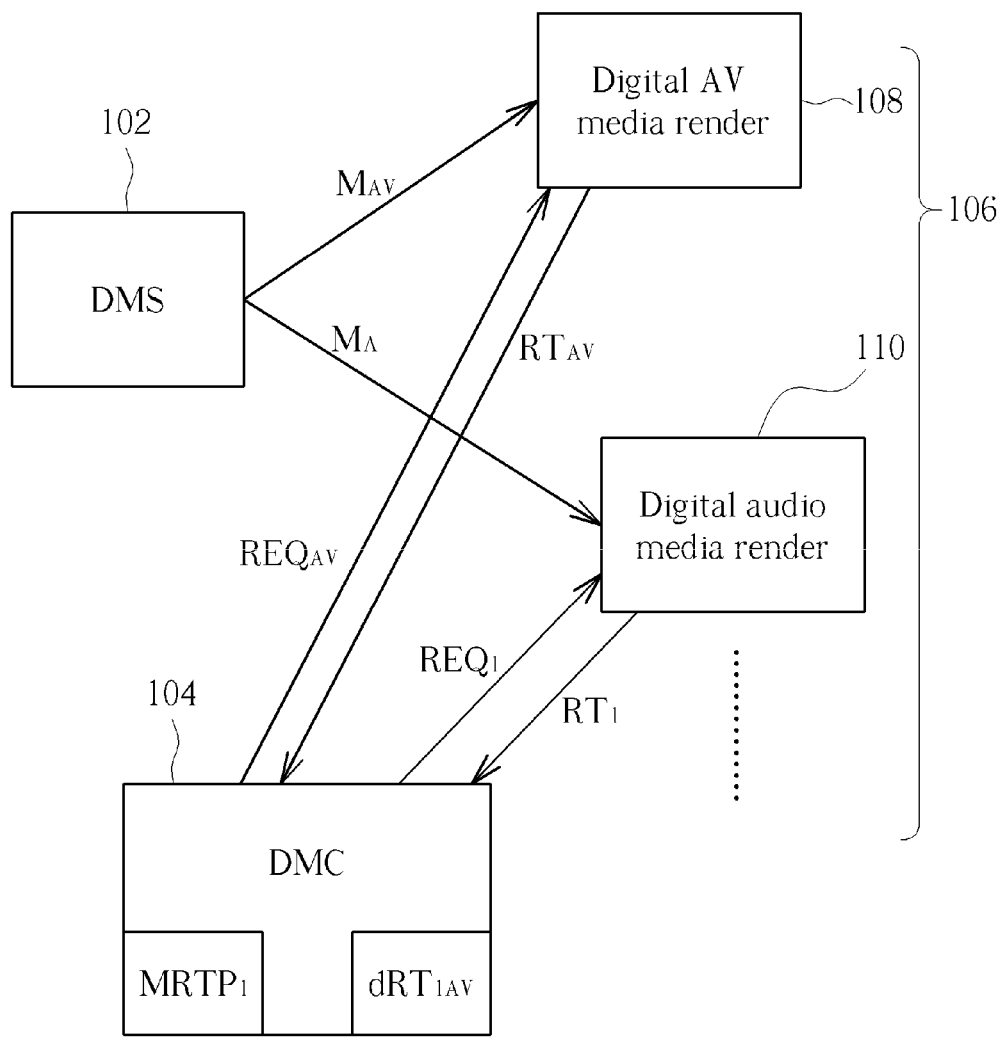
FIG. 1 is a diagram illustrating a digital media playback system according to an exemplary embodiment of the present invention.

Please refer to FIG. 1, which is a diagram illustrating a digital media playback system according to an exemplary embodiment of the present invention. In this embodiment, the exemplary digital media playback system 100 includes a DMS 102, a DMC 104, and a plurality of DMRs 106 (e.g., a digital AV media render 108 and at least one digital audio media render 110). Please note that the digital AV media render 108 (e.g., a DVD player) has video and audio playback functions, while the digital audio media render 110 (e.g., a home theater or a 5.1 channel speaker system) only has audio playback function. FIG. 1 shows only one digital audio media render for brevity and simplicity as the operation of synchronizing audio playback of one digital video media render and one digital audio media render can be readily extended to synchronizing audio playback of one digital video media render and a plurality of digital audio media renders. In fact, the exemplary digital media playback system 100 may have a plurality of digital audio media renders.

The DMC 104 may transmit digital AV data $M_{AV}$ and digital audio data $M_A$ to the digital AV media render 108 and the digital audio media render 110, respectively. Therefore, the digital AV media render 108 and the digital audio media render 110 perform the audio playback according to the digital AV data $M_{AV}$ and the digital audio data $M_A$, respectively. As mentioned above, the synchronization between the digital AV media render 108 and the digital audio media render 110 in the digital media playback system 100 is difficult to maintain stable due to the instability during the wireless transmission or the instability of the initial condition of the wireless transmission. Hence, in this embodiment, the DMC 104 is properly designed to control the synchronization between the digital AV media render 108 and the digital audio media render 110.

Figure 2:
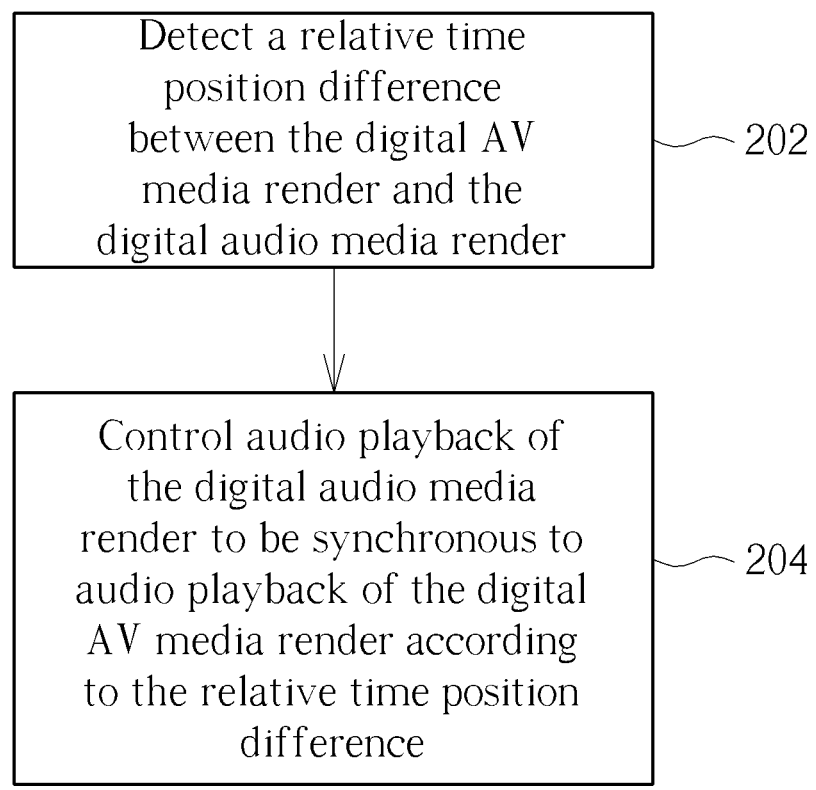
FIG. 2 is a flowchart illustrating a method for synchronizing the audio playback of the digital AV media render and the at least one digital audio media render according to an exemplary embodiment of the present invention.

Please refer to FIG. 2, which is a flowchart illustrating a method for synchronizing the audio playback of the digital AV media render 108 and the at least one digital audio media render 110 according to an exemplary embodiment of the present invention. Provided that substantially the same result is achieved, the steps of the flowchart shown in FIG. 2 need not be in the exact order shown and need not be contiguous, that is, other steps can be intermediate. Besides, some steps in FIG. 2 may be omitted according to various types of embodiments or requirements. By way of example, but not limitation, the DMC 104 may employ this method to synchronize the audio playback of the digital AV media render 108 and the at least one digital audio media render 110. The method may be briefly summarized as follows.

Step 202: Detect a relative time position difference $dRT_{1AV}$ between the digital AV media render 108 and the digital audio media render 110; and Step 204: Control audio playback of the digital audio media render 110 to be synchronous to audio playback of the digital AV media render 108 according to the relative time position difference $dRT_{1AV}$.

In accordance with the embodiment shown in FIG. 2, when the playback of the digital AV data $M_{AV}$ and the digital audio data $M_A$ is performed, the relative time position difference $dRT_{1AV}$ in step 202 is a relative time difference (i.e., asynchronous playback) between the digital AV media render 108 and the digital audio media render 110 due to some factors. By way of example, but not limitation, if the DMS 102 is connected with the digital audio media render 110 and the digital AV media render 108 by way of wireless transmission, respectively, the links would have different transmission lengths, different interference, and different channel models. That is to say, the transmission time of the digital audio data $M_A$ from the DMS 102 to the digital audio media render 110 may be different from the transmission time of the digital AV data $M_{AV}$ from the DMS 102 to the digital AV media render 108. Considering another example, but the present invention is not limited to this, when a plurality of DMRs 106 desire to perform wireless transmission or other unique active functions, independent digital circuits are required to be employed in the DMRs 106, respectively, for processing the digital AV data $M_{AV}$ or the digital audio data $M_A$ and converting it to an analog audio data. To put it another way, the digital circuits used in the DMRs 106 are clocked by independent clocks, respectively. Moreover, the clock sources of the independent clocks are not guaranteed to be identical to each other. Thus, there are frequency deviations existing between the clock sources, and the frequency deviations may lead to asynchronization which is easily perceived and needs to be compensated after accumulated for a period of time. Besides, the digital AV media render 108 could use any feasible means to obtain the relative time position difference $dRT_{1AV}$. By way of example, but not limitation, the relative time position difference $dRT_{1AV}$ may be derived from processing the data which contains timing hints/clues and are respectively transmitted from the digital AV media render 108 and the digital audio media render 110. The detailed implementation will be described later with reference to the exemplary embodiments of the present invention.

Normally, to achieve the most correct relationship between the video playback and audio playback, the video playback and the audio playback of the digital AV media render 108 in the digital media playback system 100 are taken as the main reference. In other words, the playback status of the digital AV media render 108 would be referenced by other digital media audio render(s). Therefore, the relative time position difference $dRT_{1AV}$ is utilized to control the audio playback of the digital audio media render 110 to follow the audio playback of the digital AV media render 108, and thus the audio playback of the digital audio media render 110 is synchronous to the digital AV media render 108, as shown in step 204. To put it another way, the status of the asynchronization between the digital AV media render 108 and the digital audio media render 110 is obtained through the relative time position difference $dRT_{1AV}$, and then the audio playback speed of the digital audio media render 110 may be adjusted to be faster or slower according to the relative time position difference $dRT_{1AV}$.

Figure 3:
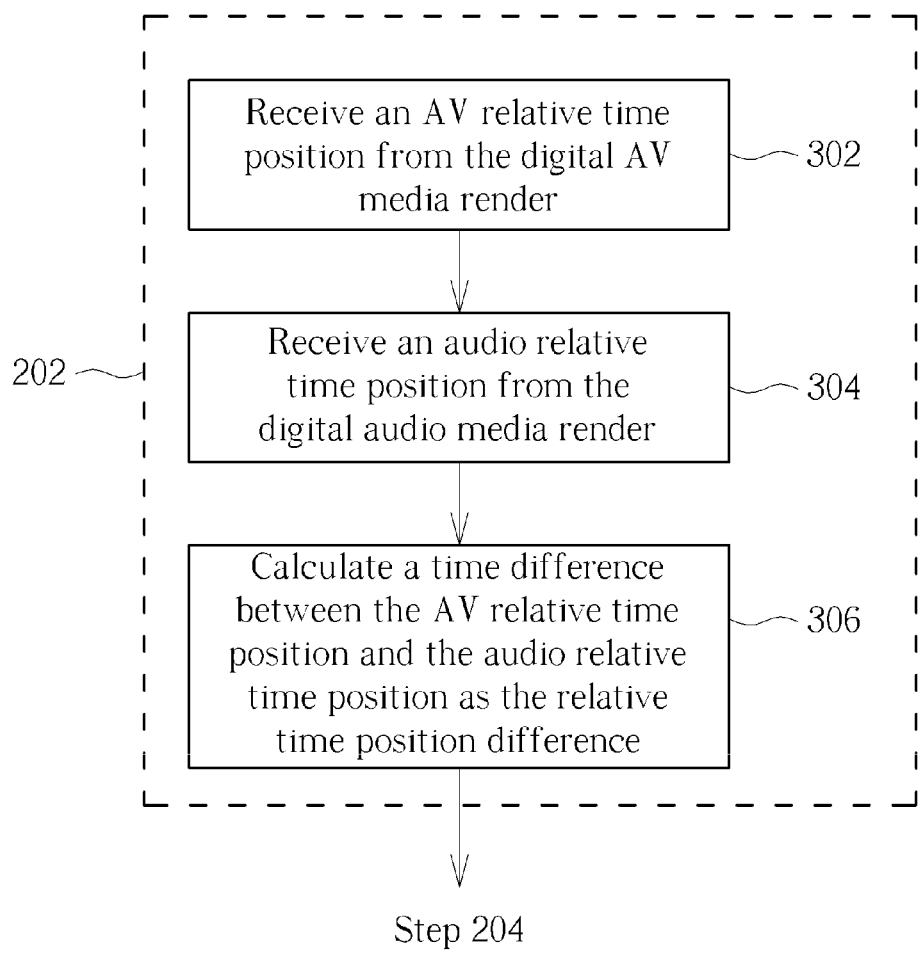
FIG. 3 is a diagram illustrating an embodiment of the step 202 shown in FIG. 2 according to the present invention.

Please refer to FIG. 3, which is a flowchart illustrating an embodiment of the step 202 shown in FIG. 2 according to the present invention. Provided that substantially the same result is achieved, the steps of the flowchart shown in FIG. 3 need not be in the exact order shown and need not be contiguous, that is, other steps can be intermediate. Besides, some steps in FIG. 3 may be omitted according to various types of embodiments or requirements. In this embodiment, the detailed operation of the step 202 may include following steps.

Step 302: Receive an AV relative time position $RT_{AV}$ from the digital AV media render 108;

Step 304: Receive an audio relative time position $RT_1$ from the digital audio media render 110; and Step 306: Calculate a time difference between the AV relative time position $RT_{AV}$ and the audio relative time position $RT_1$ as the relative time position difference $dRT_{1AV}$.

Please note that the AV relative time position $RT_{AV}$ in the step 302 is transmitted from the digital AV media render 108 to the DMC 104. The AV relative time position $RT_{AV}$ may be transmitted from the digital AV media render 108 in response to a request $REQ_{AV}$ actively sent to the digital AV media render 108 by the DMC 104. Alternatively, the AV relative time position $RT_{AV}$ may be actively transmitted from the digital AV media render 108 periodically. However, this is for illustrative purposes only, and is not meant to be a limitation of the present invention. Besides, the AV relative time position $RT_{AV}$ may include information of the length of the digital audio data $M_A$ and information of the time position of the current playback. Similarly, the audio relative time position $RT_1$ in the step 304 may also include the same information. Thus, the digital AV media render 108 outputs the audio relative time position $RT_1$ in response to the request $REQ_1$, or actively outputs the audio relative time position $RT_1$ periodically. The time difference between the AV relative time position $RT_{AV}$ and the audio relative time position $RT_1$ is used as the relative time position difference $dRT_{1AV}$, and the objective of the synchronization process is to reduce the time difference between the AV relative time position $RT_{AV}$ and the audio relative time position $RT_1$ to zero. To put it another way, the objective of the synchronization process is to reduce the relative time position difference $dRT_{1AV}$ to zero.

Figure 4:
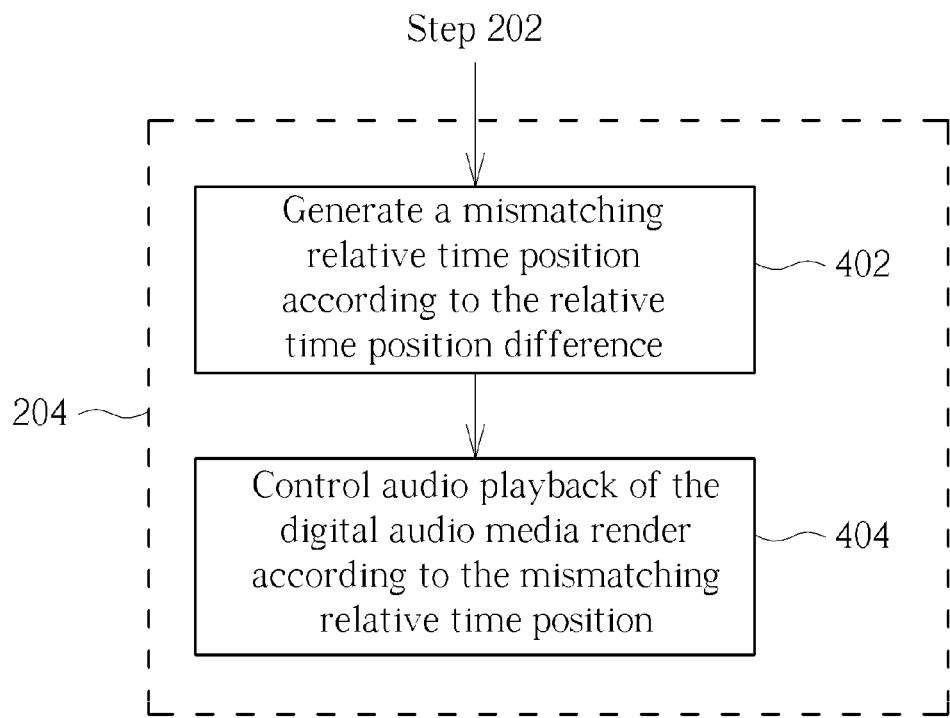
FIG. 4 is a diagram illustrating an embodiment of the step 204 shown in FIG. 2 according to the present invention.

Please refer to FIG. 4, which is a flowchart illustrating an embodiment of the step 204 shown in FIG. 2 according to the present invention. Provided that substantially the same result is achieved, the steps of the flowchart shown in FIG. 4 need not be in the exact order shown and need not be contiguous, that is, other steps can be intermediate. Besides, some steps in FIG. 4 may be omitted according to various types of embodiments or requirements. In this embodiment, the detailed operation of the step 204 may include following steps.

Step 402: Generate a mismatching relative time position $MRTP_1$ according to the relative time position difference $dRT_{1AV}$; and Step 404: Control audio playback of the digital audio media render 110 according to the mismatching relative time position $MRTP_1$.

In an embodiment of the present invention, the DMC 104 generates a mismatching relative time position $MRTP_1$ according to the relative time position difference $dRT_{1AV}$, where the mismatching relative time position $MRTP_1$ is used to control the playback of the digital audio media render 110. Therefore, the mismatching relative time position $MRTP_1$ in the step 402 is obtained through computation on the relative time position difference $dRT_{1AV}$. The detailed implementation is described later. Besides, as shown in step 404, the DMC 104 controls the playback of the digital audio media render 110 to be synchronous to the playback of the digital AV media render 108 directly or indirectly, according to the mismatching relative time position $MRTP_1$.

Figure 5:
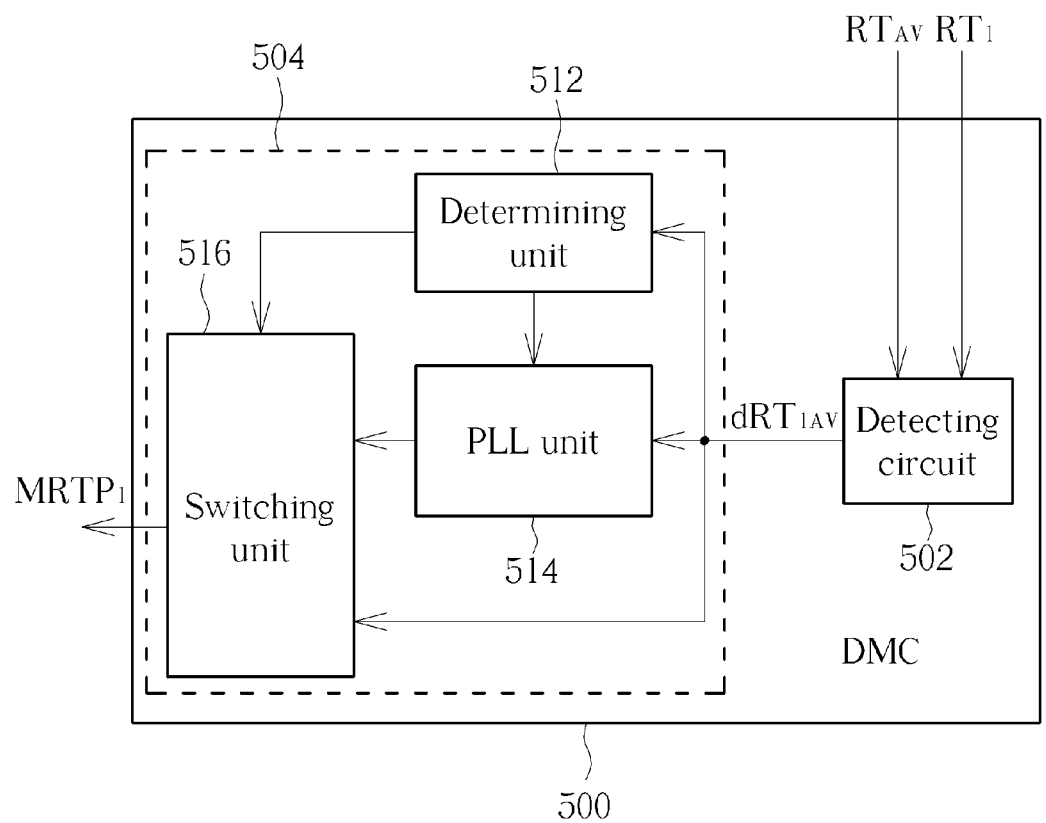
FIG. 5 is a block diagram illustrating an embodiment of the digital media controller shown in FIG. 1 according to the present invention.

Please refer to FIG. 5, which is a block diagram illustrating an embodiment of the DMC 104 shown in FIG. 1 according to the present invention. The DMC 104 may be implemented using a DMC 500. The DMC 500 is used to synchronize audio playback of a plurality of DMRs. The DMC 500 includes a detecting circuit 502, and a control circuit 504 coupled to the detecting circuit 502, wherein the detecting circuit 502 is arranged to perform the aforementioned step 202, and the control circuit 504 is arranged to perform the aforementioned step 204. To put it another way, the detecting circuit 502 is used to detect the relative time position difference $dRT_{1AV}$ between the AV relative time position $RT_{AV}$ of the digital AV media render 108 and the audio relative time position $RT_1$ of the digital audio media render 110. And the control circuit 504 is used to output the mismatching relative time position $MRTP_1$ according to the relative time position difference $dRT_{1AV}$, and therefore controls the playback of the digital audio media render 110 directly or indirectly, thereby ensuring that the playback of the digital audio media render 110 is synchronous to the playback of the digital AV media render 108. In this embodiment, the control circuit 504 includes a determining unit 512, a phase-locked loop (PLL) unit 514, and a switching unit 516, wherein the detecting circuit 502 is coupled to the determining unit 512, the PLL unit 514, and the switching unit 516, respectively, and the determining unit 512 is coupled to the PLL unit 514 and the switching unit 516, respectively. The control circuit 504 may adopt the method shown in FIG. 6 to obtain the mismatching relative time position $MRTP_1$.

Figure 6:
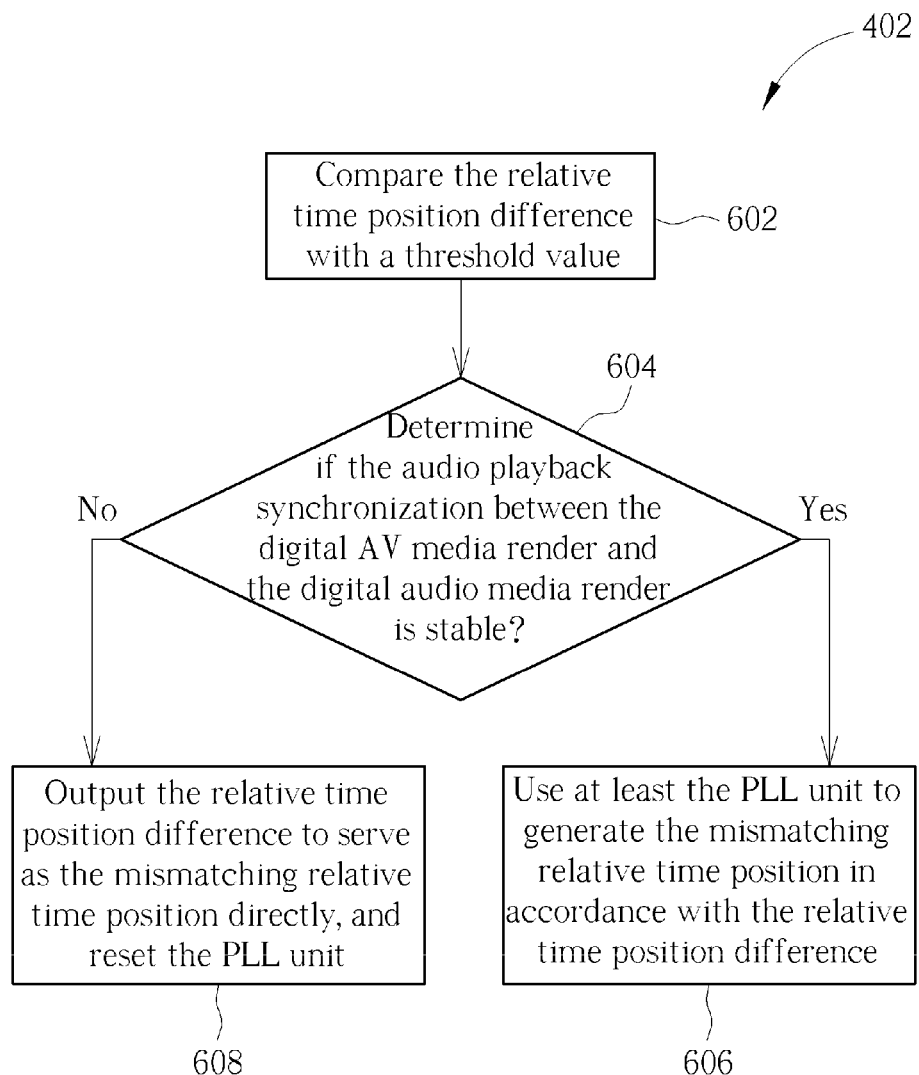
FIG. 6 is a flowchart illustrating an embodiment of the step 402 shown in FIG. 4 according to the present invention.

Please refer to FIG. 6 in conjunction with FIG. 5. FIG. 6 is a flowchart illustrating an embodiment of the step 402 shown in FIG. 4 according to the present invention. Provided that substantially the same result is achieved, the steps of the flowchart shown in FIG. 6 need not be in the exact order shown and need not be contiguous, that is, other steps can be intermediate. Besides, some steps in FIG. 6 may be omitted according to various types of embodiments or requirements. In this embodiment, the detailed operation of the step 402 may include following steps.

Step 602: Compare the relative time position difference $dRT_{1AV}$ with a threshold value $dRT_{TH}$;

Step 604: Determine if the audio playback synchronization between the digital AV media render 108 and the digital audio media render 110 is stable. When the relative time position difference $dRT_{1AV}$ is less than the threshold value $dRT_{TH}$, the determining unit determines that the audio playback synchronization is under a stable state, and the flow proceeds with step 606; and when the relative time position difference $dRT_{1AV}$ is not less than the threshold value $dRT_{TH}$, the determining unit determines the audio playback synchronization is not under a stable state, and the flow proceeds with step 608.

Step 606: Use at least the PLL unit 514 to generate the mismatching relative time position $MRTP_1$ in accordance with the relative time position difference $dRT_{1AV}$; and Step 608: Output the relative time position difference $dRT_{1AV}$ to serve as the mismatching relative time position $MRTP_1$ directly, and reset the PLL unit 514.

The determining unit 512 performs steps 602 and 604 to determine if the audio playback synchronization between the digital AV media render 108 and the digital audio media render 110 is under a stable state or not, and the switching unit 516 selectively chooses the output of the PLL unit 514 (step 606) or the output of the detecting circuit 502 (step 608) as the mismatching relative time position $MRTP_1$. It should be noted that the synchronization status detecting result derived from steps 602 and 604 is used for distinguishing between two processing methods of the relative time position difference $dRT_{1AV}$. Generally speaking, a larger relative time position difference $dRT_{1AV}$ between the digital AV media render 108 and the digital audio media render 110 may be apparent at the initial state of the link or may be induced by the reconnection due to the disconnection caused by the poor signal quality. Under a condition where there is a normal link with continuous transmission, the relative time position difference $dRT_{1AV}$ is usually with small variation. In accordance with the aforementioned determination mechanism, the relative time position difference $dRT_{1AV}$ under a stable synchronization status may result from a minor factor such as irregular small variation caused by clock jitter and random noise, and a major factor such as continuous accumulation of the frequency difference of clock sources of the digital AV media render 108 and the digital audio media render 110, which makes the relative time position difference $dRT_{1AV}$ increase in a slow and linear way and finally reach a level that the user or audience can feel the audio playback asynchronization. Furthermore, the range of variation of the relative time position difference $dRT_{1AV}$ under the stable synchronization condition is not wide. Besides, it is difficult to distinguish between the irregular small variation induced by clock jitter and random noise and the regular variation induced by frequency deviation. Therefore, to avoid system instability, the relative time position difference $dRT_{1AV}$ needs to be pre-processed before used. In the exemplary embodiment, the relative time position difference $dRT_{1AV}$ acts as a phase error and is fed into the PLL unit 514 to track the clock of the digital AV media render 108 (step 606). However, if the audio playback synchronization is not in the stable state, immediate compensation is required because the relative time position difference $dRT_{1AV}$ is usually unpredictable and larger. Thus, under the synchronization unstable state, the relative time position difference $dRT_{1AV}$ is directly outputted to serve as the mismatching relative time position $MRTP_1$, and the PLL unit 514 is reset (step 608).

It should be noted that the method to determine if the audio playback synchronization between the digital AV media render 108 and the digital audio media render 110 is stable or not is not limited to the steps in FIG. 6, and the threshold $dRT_{TH}$ in step 602 may be configured according to different operating environments or applications. Moreover, the threshold $dRT_{TH}$ may be an adaptive variable (e.g., auto-configurable in accordance with the operating environment). The aforementioned designs are all belong to the scope of the present invention.

Besides, one control circuit 504 processes only one relative time position difference $dRT_{1AV}$ for audio playback control. Therefore, regarding the DMC 500 shown in FIG. 5, it is suitable for a system with one digital AV media render and one digital audio media render. However, the DMC 500 may be applied to a system with M digital audio media renders through proper modification by extending the design to M corresponding control circuits. In this way, the DMC 500 outputs the mismatching relative time positions $MRTP_1$, $MRTP_2$, ..., $MRTP_M$ according to the corresponding relative time position differences $dRT_{1AV}$, $dRT_{2AV}$, ..., $dRT_{MAV}$, respectively.

Figure 7:
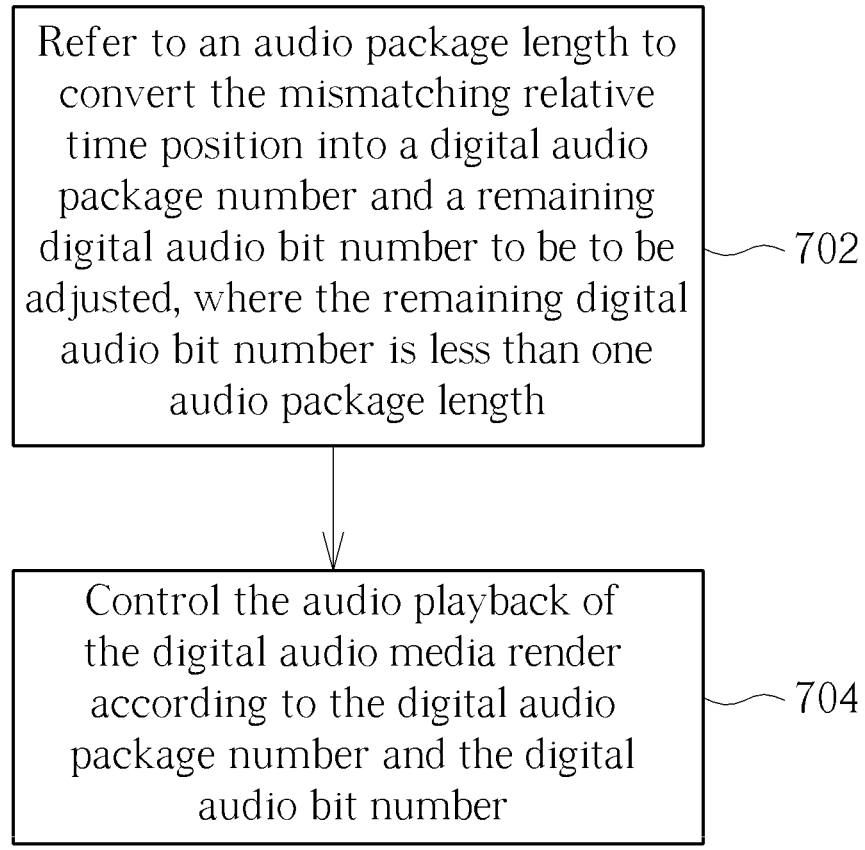
FIG. 7 is a flowchart illustrating a method for controlling the audio playback of the digital audio media render by referring to the mismatching relative time position according to an exemplary embodiment of the present invention.

In this exemplary embodiment, the DMC 104/500 outputs the mismatching relative time position $MRTP_1$ to the digital audio media render 110 to control the audio playback of the digital audio media render 110. In other words, the audio playback of the digital audio media render 110 is adjusted correspondingly based on the mismatching relative time position $MRTP_1$. Please refer to FIG. 7, which is a flowchart illustrating a method for controlling the audio playback of the digital audio media render 110 by referring to the mismatching relative time position $MRTP_1$ according to an exemplary embodiment of the present invention. Provided that substantially the same result is achieved, the steps of the flowchart shown in FIG. 7 need not be in the exact order shown and need not be contiguous, that is, other steps can be intermediate. Besides, some steps in FIG. 7 may be omitted according to various types of embodiments or requirements. In this embodiment, the detailed operation for controlling the audio playback of the digital audio media render 110 may include following steps.

Step 702: Refer to an audio package length to convert the mismatching relative time position $MRTP_1$ into a digital audio package number $V_P$ and a remaining digital audio bit number $V_B$ to be to be adjusted, where the remaining digital audio bit number $V_B$ is less than one audio package length; and Step 704: Control the audio playback of the digital audio media render 110 according to the digital audio package number $V_P$ and the digital audio bit number $V_B$.

The operation of synchronizing the audio playback of the digital AV media render 108 and audio playback of the digital audio media render 110 is to ensure that the digital AV media render 108 and the digital audio media render 110 play the same time position of the digital AV data $M_{AV}$ and the digital audio data $M_A$ at the same time. In other words, the digital AV media render 108 and the digital audio media render 110 should be guaranteed to play the same bit of the same audio package at every moment while the system is in a stable playback and good synchronization state. Therefore, in order to facilitate the synchronization control of the digital audio media render 110 according to two different length units, step 702 is executed to refer to the audio package length to convert the mismatching relative time position $MRTP_1$ into a digital audio package number $V_P$ and a remaining digital audio bit number $V_B$ which is less than an audio package length. If the digital audio package number $V_P$ and the digital audio bit number $V_B$ are both nonzero, the digital audio package number $V_P$ may affect the audio playback of the digital audio media render 110 by using a package as one adjustment unit, and the digital audio bit number $V_B$ may affect the digital audio media render 110 by using a bit as one adjustment unit; if the digital audio package number $V_P$ is nonzero and the digital audio bit number $V_B$ is zero, the digital audio package number $V_P$ may affect the digital audio media render 110 by using a package as one adjustment unit; if the digital audio package number $V_P$ is zero and the digital audio bit number $V_B$ is nonzero, the digital audio bit number $V_B$ may affect the digital audio media render 110 by using a bit as one adjustment unit.

In an exemplary implementation, the digital audio media render 110 is responsible for generating the digital audio package number $V_P$ and the digital audio bit number $V_B$ (step 702), and the audio playback control of the digital audio media render 110 is performed through the digital audio media render 110 and internal components of the DMS 102 (step 704). Furthermore, in another exemplary implementation, the digital audio media render 110 is responsible for generating the digital audio package number $V_P$ and the digital audio bit number $V_B$ (step 702), and the audio playback control of the digital audio media render 110 is performed through internal components of the digital audio media render 110 only (step 704). Further details are described as below.

Figure 8:
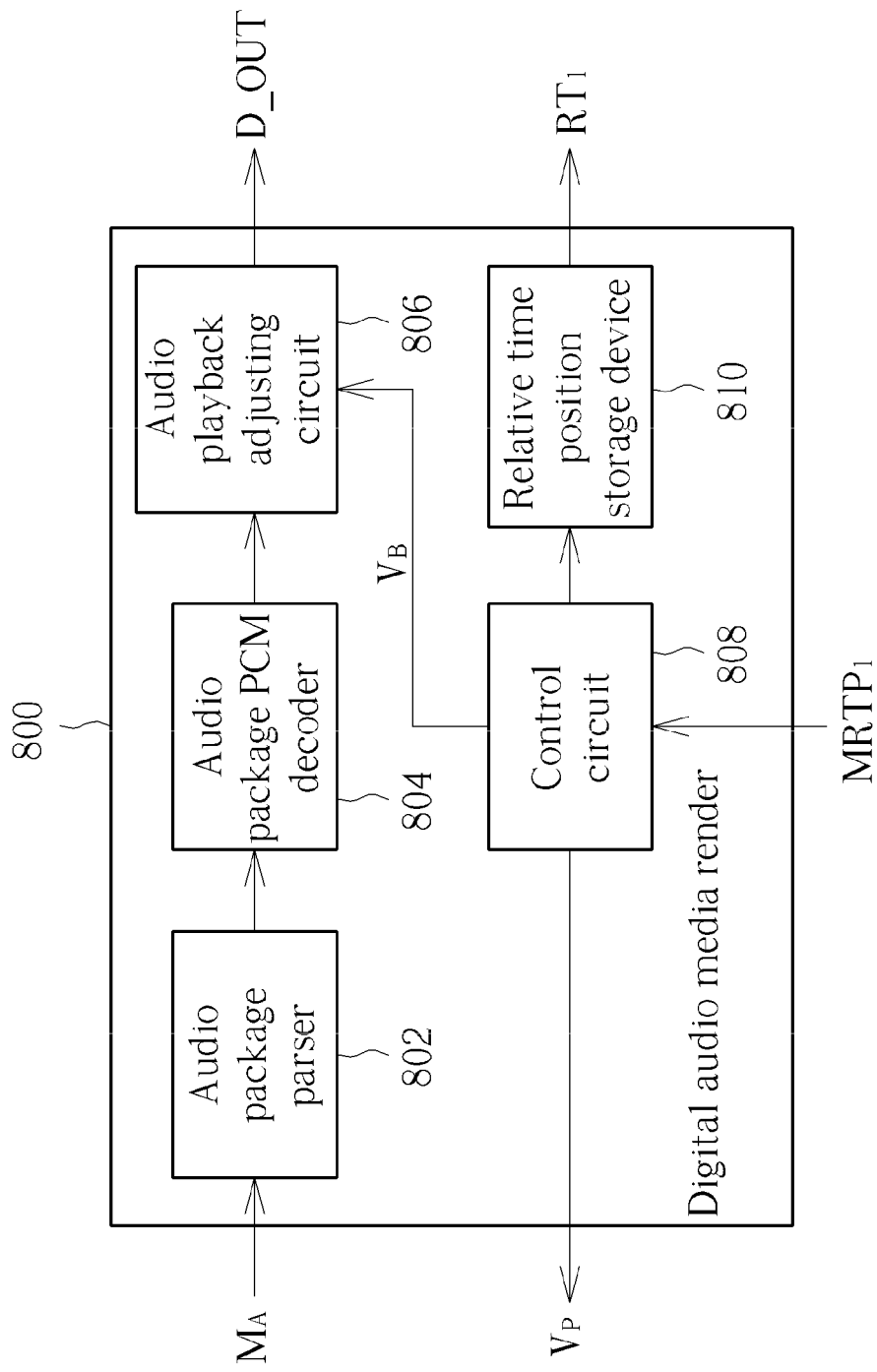
FIG. 8 is a diagram illustrating a first embodiment of the digital audio media render shown in FIG. 1 according to the present invention.
Figure 9:
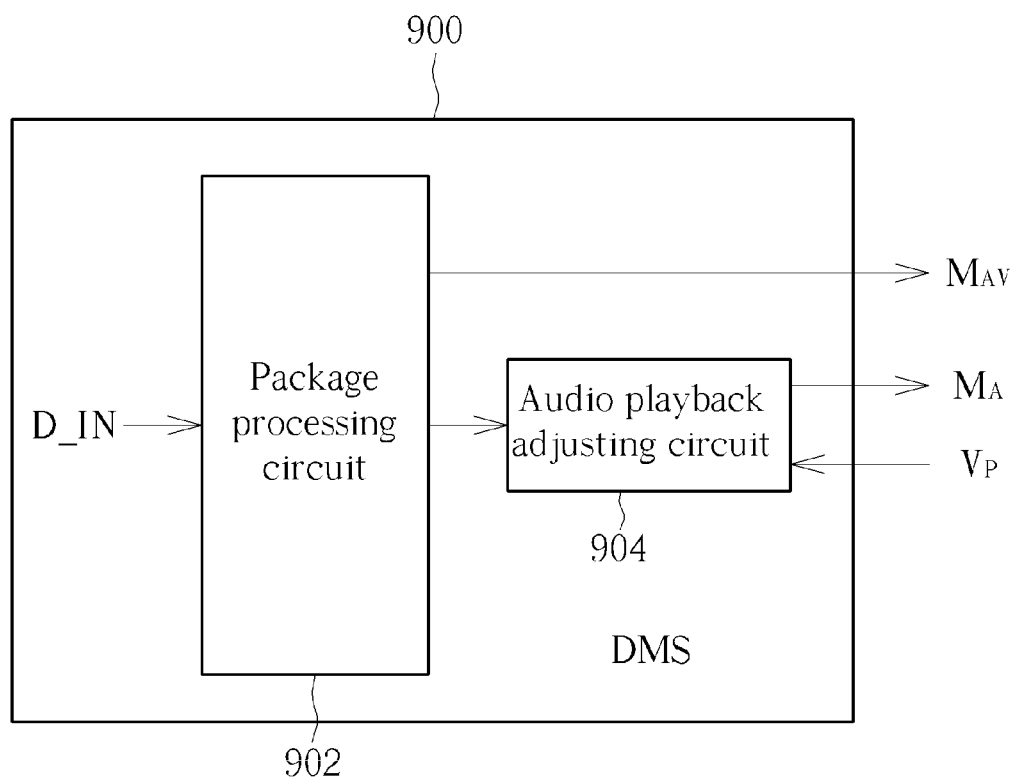
FIG. 9 is a diagram illustrating another embodiment of the digital media controller shown in FIG. 1 according to the present invention.

Please refer to FIG. 8 in conjunction with FIG. 9. FIG. 8 is a diagram illustrating a first embodiment of the digital audio media render 110 shown in FIG. 1 according to the present invention, and FIG. 9 is a diagram illustrating an embodiment of the DMS 102 shown in FIG. 1. The digital audio media render 110 may be implemented using a digital audio media render 800, and the DMS 102 may be implemented using a DMS 900. In this exemplary embodiment, the digital audio media render 800 includes an audio package parser 802, an audio package pulse-code modulation (PCM) decoder 804, an audio playback adjusting circuit (e.g., a block PCM data shift controller) 806, a control circuit 808, and a relative time position storage device (e.g., a memory) 810. The DMS 900 includes a package processing circuit 902 and an audio playback adjusting circuit (e.g., a package skip module) 904. The audio package parser 802 receives a digital audio data input (e.g., the digital audio data $M_A$ obtained from the DMS 900), and feeds parsed packages to the audio package decoder 804 to convert the packages into raw data (i.e., the PCM data) which is then fed into the audio playback adjusting circuit 806. Furthermore, the audio playback adjusting circuit 806 is controlled by the control circuit 808 to make the audio playback of the digital audio media render 800 synchronous to the audio playback of the digital AV media render 108, wherein the control circuit 808 receives the mismatching relative time position $MRTP_1$ from the DMC 104 and refers to the audio package length to convert the mismatching relative time position $MRTP_1$ into a digital audio package number $V_P$ and a digital audio bit number $V_B$ which is less than an audio package length. In this exemplary embodiment, the digital audio bit number $V_B$ is fed into the audio playback adjusting circuit 806, and the digital audio package number $V_P$ is fed into the DMS 900 to adjust the audio packages transmitted from the DMS 900 to the digital audio media render 800. In addition, the control circuit 808 further updates the audio playback relative time position $RT_1$ according to the mismatching relative time position $MRTP_1$.

Regarding the DMS 900, it may generate a digital AV data $M_{AV}$ and a digital audio data $M_A$, wherein the package processing circuit 902 is coupled to the audio playback adjusting circuit 904, and arranges a digital AV data D_IN in a desired package format, wherein data related to the digital audio is fed into the audio playback adjusting circuit 904. The audio playback adjusting circuit 904 controls the output of the digital audio data $M_A$ according to the digital audio package number $V_P$ generated from the digital audio media render 800, and directly outputs another digital AV data $M_{AV}$ without any adjustment applied thereto. Please note that one audio playback adjusting circuit 904 controls only one digital audio data output which is provided to one digital audio media render. Therefore, regarding the DMS 900 shown in FIG. 9, it is suitable for a system with one digital AV media render and one digital audio media render. However, the DMS 900 can be applied to a system with M digital audio media renders through proper modification by extending the design to M corresponding audio playback adjusting circuit used to control M digital audio data outputs of M digital audio media renders, respectively.

In this embodiment, the audio playback adjusting circuit 904 disposed in the DMS 900 could adjust the audio playback of the digital audio media render 800 by skipping audio packages (i.e., speeding up the audio playback), while the audio playback adjusting circuit 806 disposed in the digital audio media render 800 could adjust the audio playback of the digital audio media render 800 by skipping the audio data bits decoded by the audio package decoder 804 (i.e., speeding up the audio playback) or adding new audio data bits, each having a logic value '0', to the audio data bits decoded by the audio package decoder 804 (i.e., slowing down the audio playback).

As mentioned above, the mismatching relative time position $MRTP_1$ is converted into the digital audio package number $V_P$ and the digital audio bit number $V_B$. That is to say, two components with different unit levels are utilized to adjust the digital audio media render 800 to obtain two features, including fast synchronization and stable synchronization. To put it another way, a coarse-tuning component and a fine-tuning component are used for controlling the audio playback of the digital audio media render 800. The coarse-tuning component (i.e., the digital audio package number $V_P$) is fed into the DMS 900 to adjust the position of the audio playback by using a package as one adjustment unit, and the fine-tuning component (i.e., the digital audio bit number $V_B$) is fed into the digital audio media render 800 to adjust the position of the audio playback by using a bit as one adjustment unit. However, when the DMS 900 processes the synchronization by skipping audio packets, the digital audio media render 800 may be temporarily set to a silence mode as the change is more dramatic, which prevents the user from perceiving the uncomfortable audio playback. When the digital audio media render 800 adjusts the position of the audio playback by using a bit as one adjustment unit under the stable state, the digital audio media render 800 does not need to enter the salience mode because the change is hard to be perceived by the user.

Figure 10:
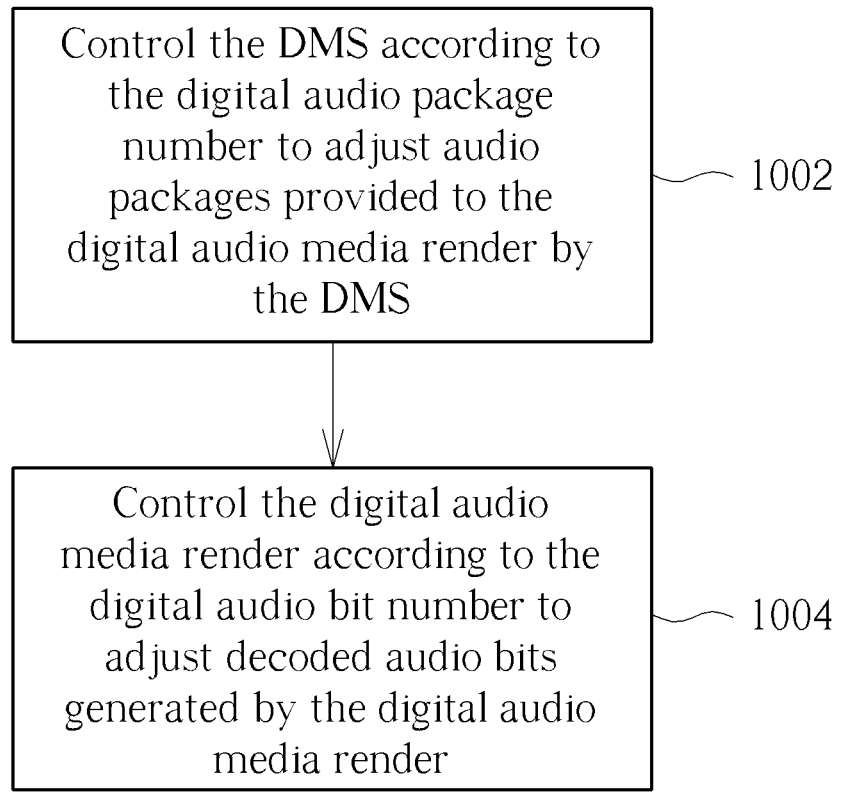
FIG. 10 is a flowchart illustrating a method for controlling the audio playback of the digital audio media render by referring to the digital audio package number and the digital audio bit number according to a first embodiment of the present invention.

Please refer to FIG. 10, which is a flowchart illustrating a method for controlling the audio playback of the digital audio media render 110 by referring to the digital audio package number and the digital audio bit number according to a first embodiment of the present invention. Provided that substantially the same result is achieved, the steps of the flowchart shown in FIG. 10 need not be in the exact order shown and need not be contiguous, that is, other steps can be intermediate. Besides, some steps in FIG. 10 may be omitted according to various types of embodiments or requirements. In this embodiment, the method for controlling the audio playback of the digital audio media render 110 may include following steps.

Step 1002: Control the DMS according to the digital audio package number to adjust audio packages provided to the digital audio media render by the DMS; and Step 1004: Control the digital audio media render according to the digital audio bit number to adjust decoded audio bits generated by the digital audio media render.

As a person skilled in the art can readily understand operations of the steps shown in FIG. 10 after reading above paragraphs, further description is omitted here for brevity.

Figure 11:
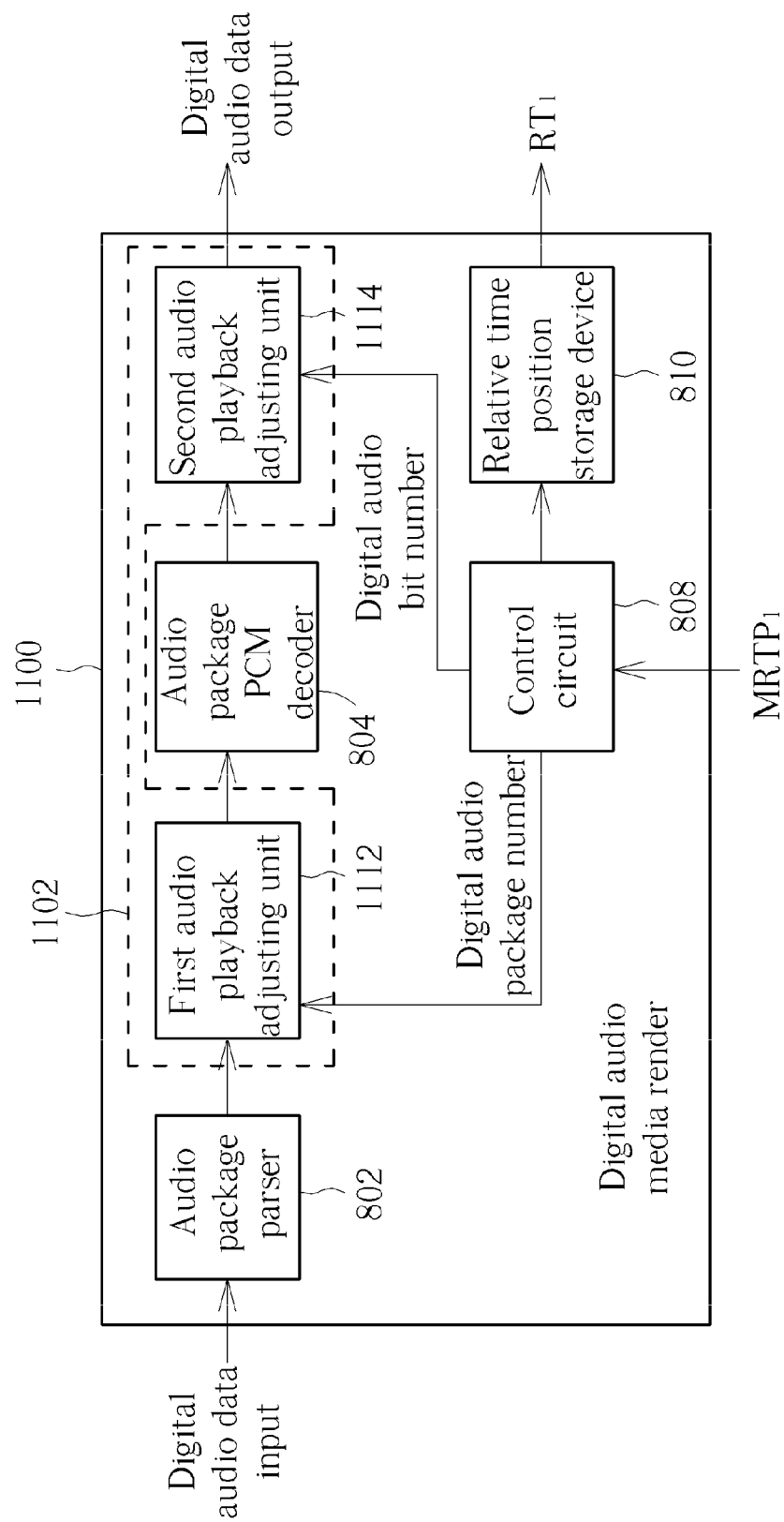
FIG. 11 is a diagram illustrating a second embodiment of the digital audio media render shown in FIG. 1 according to the present invention.

Please refer to FIG. 11, which is a diagram illustrating a second example of the digital audio media render 104 shown in FIG. 1 according to the present invention. The digital audio media render 104 may be implemented using a digital audio media render 1100. In this exemplary embodiment, the digital audio media render 1100 includes the aforementioned audio package parser 802, audio package decoder 804, control circuit 808 and relative time position storage device 810, and further includes an audio adjusting circuit 1102 having a first audio playback adjusting unit (e.g., an audio package skip controller) 1112 and a second audio playback adjusting unit (e.g., a block PCM data shift controller) 1114. The digital audio package number $V_P$ and the digital audio bit number $V_B$ generated by the control circuit 808 are used to control the first audio playback adjusting unit 1112 and the second audio playback adjusting unit 1114 of the audio adjusting circuit 1102, respectively, for making the audio playback of the digital audio media render 1100 synchronous to the audio playback of the digital AV media render 108.

Figure 12:
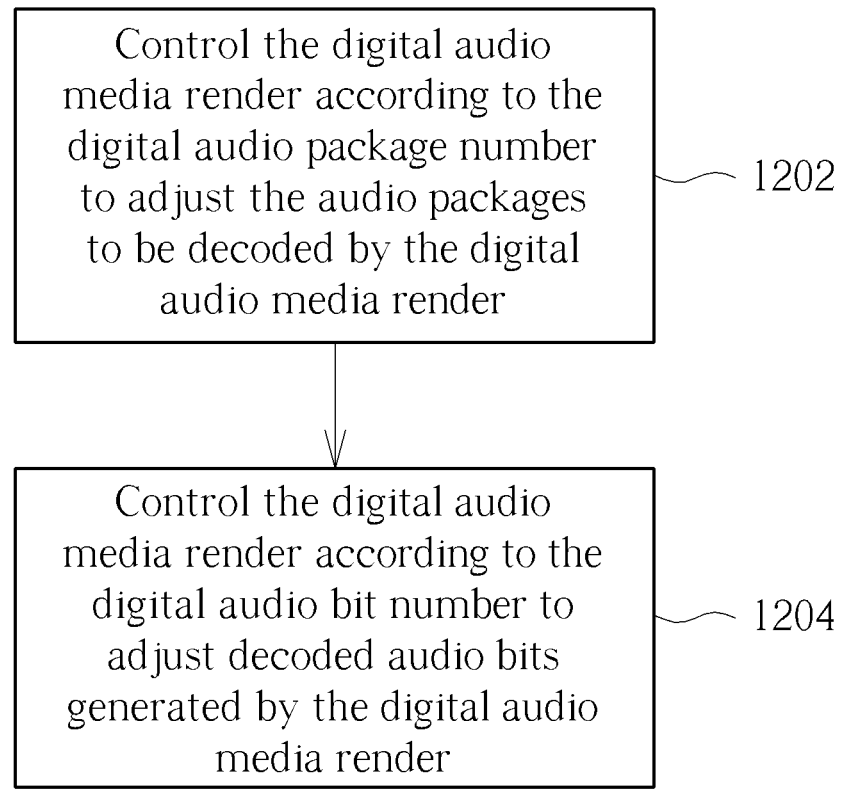
FIG. 12 is a flowchart illustrating a method for controlling the audio playback of the digital audio media render by referring to the digital audio package number and the digital audio bit number according to a second embodiment of the present invention.

Please refer to FIG. 12, which is a flowchart illustrating a method for controlling the audio playback of the digital audio media render 110 by referring to the digital audio package number and the digital audio bit number according to a second embodiment of the present invention. Provided that substantially the same result is achieved, the steps of the flowchart shown in FIG. 12 need not be in the exact order shown and need not be contiguous, that is, other steps can be intermediate. Besides, some steps in FIG. 12 may be omitted according to various types of embodiments or requirements. In this embodiment, the method for controlling the audio playback of the digital audio media render 110 may include following steps.

Step 1202: Control the digital audio media render according to the digital audio package number $V_P$ to adjust the audio packages to be decoded by the digital audio media render; and Step 1204: Control the digital audio media render according to the digital audio bit number $V_B$ to adjust decoded audio bits generated by the digital audio media render.

As a person skilled in the art can readily understand operations of the steps shown in FIG. 12 after reading above paragraphs, further description is omitted here for brevity.

It should be noted that converting the mismatching relative time position $MRTP_1$ into the digital audio package number $V_P$ and the digital audio bit number $V_B$ is only one of various feasible implementations of synchronization control. By way of example, but not limitation, the mismatching relative time position $MRTP_1$ may be directly used to control the audio playback of the digital audio media render when the mismatching relative time position $MRTP_1$ is small. Please refer to FIG. 13, which is a diagram illustrating a third embodiment of the digital audio media render 104 shown in FIG. 1 according to the present invention. The digital audio media render 104 may be implemented using a digital audio media render 1300. In this exemplary embodiment, the digital audio media render 1300 includes the aforementioned audio package parser 802, audio package decoder 804, audio playback adjusting circuit 806 and relative time position storage device 810, and further includes a control circuit 1302. The control circuit 1302 directly outputs the mismatching relative time position $MRTP_1$ to control the audio playback adjusting circuit 806 for making the audio playback of the digital audio media render 1300 synchronous to the audio playback of the digital AV media render 108. This alternative design also belongs to the scope of the present invention.

Figure 13:
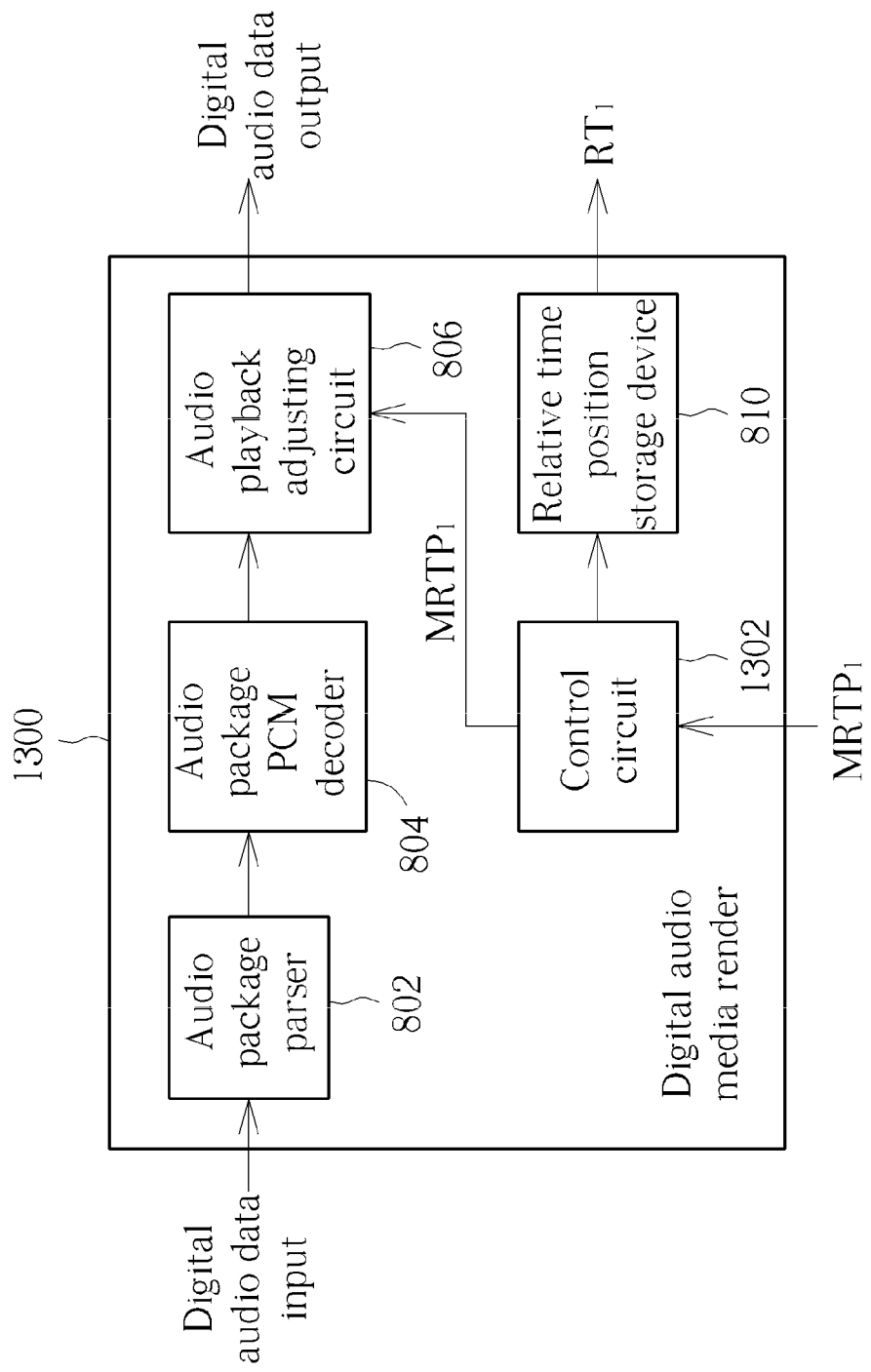
FIG. 13 is a diagram illustrating a third embodiment of the digital audio media render shown in FIG. 1 according to the present invention.

In the digital audio media renders shown in FIGS. 8, 11, and 13, the control circuit 808/1302 updates the audio playback relative time position $RT_1$ recorded in the relative time position storage device 810 according to the mismatching relative time position $MRTP_1$, wherein the mismatching relative time position $MRTP_1$ is derived from the relative time position difference $dRT_{1AV}$, and the relative time position difference $dRT_{1AV}$ is derived from the audio playback relative time position $RT_1$. To put it another way, the mismatching relative time position $MRTP_1$ is derived from the audio playback relative time position $RT_1$. Therefore, when the mismatching relative time position $MRTP_1$ is used to adjust the audio playback of the digital audio media render, the audio playback relative time position $RT_1$ needs to be simultaneously updated based on the value of the applied adjustment to avoid the digital audio media render from being adjusted or compensated repeatedly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of synchronizing audio playback of a plurality of digital media renders (DMRs), wherein the DMRs comprise a digital audio/video (AV) media render and at least one digital audio media render, the method comprising:
    detecting a relative time position difference between the digital AV media render and the digital audio media render;
    generating a mismatching relative time position according to the relative time position difference, comprising:
        determining if audio playback synchronization between the digital AV media render and the digital audio media render is under a stable state; and
        if the audio playback synchronization is under the stable state, providing the relative time position difference, acting as a phase error needs to be eliminated, to at least a phase-locked loop (PLL) unit to generate the mismatching relative time position; and
    controlling audio playback of the digital audio media render to be synchronous to audio playback of the digital AV media render according to the mismatching relative time position.

2. The method of claim 1, wherein the DMRs receive audio data from a digital media server (DMS) for audio playback via wireless connection.

3. The method of claim 1, wherein the step of detecting the relative time position difference comprises:
    receiving an AV relative time position from the digital AV media render;
    receiving an audio relative time position from the digital audio media render; and
    calculating a time difference between the AV relative time position and the audio relative time position as the relative time position difference.

4. The method of claim 1, wherein the step of generating the mismatching relative time position further comprises:
    if the audio playback synchronization is not under the stable state, directly outputting the relative time position difference to serve as the mismatching relative time position, and resetting the PLL unit.

5. The method of claim 1, wherein the step of determining if audio playback synchronization between the digital AV media render and the digital audio media render is under the stable state comprises:
comparing the relative time position difference with a threshold value;
when the relative time position difference is less than the threshold value, determining that the audio playback synchronization is under the stable state; and
when the relative time position difference is not less than the threshold value, determining that the audio playback synchronization is not under the stable state.

6. The method of claim 1, wherein the step of controlling audio playback of the digital audio media render according to the mismatching relative time position comprises:
referring to an audio package length for converting the mismatching relative time position into a digital audio package number and a remaining digital audio bit number which is less than the audio package length; and
controlling the audio playback of the digital audio media render according to the digital audio package number and the remaining digital audio bit number.

7. The method of claim 6, wherein the step of controlling the audio playback of the digital audio media render according to the digital audio package number and the remaining digital audio bit number comprises:
controlling a digital media server (DMS) according to the digital audio package number for adjusting audio packages provided to the digital audio media render by the DMS; and
controlling the digital audio media render according to the remaining digital audio bit number for adjusting decoded audio bits generated by the digital audio media render.

8. The method of claim 6, wherein the step of controlling the audio playback of the digital audio media render according to the digital audio package number and the remaining digital audio bit number comprises:
controlling the digital audio media render according to the digital audio package number for adjusting audio packages to be decoded by the digital audio media render; and
controlling the digital audio media render according to the remaining digital audio bit number for adjusting decoded audio bits generated by the digital audio media render.

9. The method of claim 1, wherein the step of controlling audio playback of the digital audio media render according to the mismatching relative time position comprises:
controlling the digital audio media render according to the mismatching relative time position for adjusting decoded audio bits generated by the digital audio media render.

10. The method of claim 1, wherein the step of controlling audio playback of the digital audio media render according to the mismatching relative time position further comprises:
updating an audio relative time position of the digital audio media render according to the mismatching relative time position.

11. A digital media controller (DMC) for synchronizing audio playback of a plurality of digital media controllers (DMRs), wherein the DMRs comprise a digital audio/video (AV) media render and at least one digital audio media render, the DMC comprising:
a detecting circuit, arranged for detecting a relative time position difference between the digital AV media render and the digital audio media render; and
a control circuit, coupled to the detecting circuit, arranged for controlling audio playback of the digital audio media render to be synchronous to audio playback of the digital AV media render according to the relative time position difference, the control circuit comprising:
a determining unit, arranged for determining if audio playback synchronization between the digital AV media render and the digital audio media render is under a stable state;
a phase-locked loop (PLL) unit, arranged for generating the mismatching relative time position by receiving the relative time position difference to act as a phase error needs to be eliminated; and
a switching unit, coupled to the determining unit and the PLL unit, the switching unit arranged for outputting the mismatching relative time position generated from the PLL unit when the determining unit determines that the audio playback synchronization is under the stable state.

12. The DMC of claim 11, wherein the detecting circuit receives a first audio relative time position from the digital AV media render, receives a second audio relative time position from the digital audio media render, and calculates a time difference between the first audio relative time position and the second audio relative time position as the relative time position difference.

13. The DMC of claim 11, wherein
when the determining unit determines that the audio playback synchronization is not under the stable state, the PLL unit is reset; and
the switching unit is further arranged for directly outputting the relative time position difference to serve as the mismatching relative time position when the determining unit determines that the audio playback synchronization is not under the stable state.

14. The DMC of claim 11, wherein the determining unit compares the relative time position difference with a threshold value; when the relative time position difference is less than the threshold value, the determining unit determines that the audio playback synchronization is under the stable state; and when the relative time position difference is not less than the threshold value, the determining unit determines that the audio playback synchronization is not under the stable state.

15. A digital audio media render, comprising:
an audio playback adjusting circuit; and
a control circuit, arranged for receiving a mismatching relative time position from a digital media controller (DMC), referring to an audio package length to convert the mismatching relative time position into a digital audio package number and a remaining digital audio bit number which is less than the audio package length, and controlling the audio playback of the digital audio media render according to the digital audio package number and the remaining digital audio bit number, thereby to allow the audio playback of the digital audio media render synchronous to the audio playback of the digital AV media render, wherein the mismatching relative time position corresponds to a relative time position difference between the digital audio media render and the digital AV media render.

16. The digital audio media render of claim 15, wherein the digital audio media render receives audio data from a digital media server (DMS) for audio playback via wireless connection.

17. The digital audio media render of claim 15, wherein the control circuit outputs the digital audio package number to a digital media server (DMS) to adjust audio packages provided to the digital audio media render by the DMS, and outputs the remaining digital audio bit number to the audio playback adjusting circuit; and the audio playback adjusting circuit adjusts decoded audio bits generated by the digital audio media render according to the remaining digital audio bit number.

18. The digital audio media render of claim 15, wherein the control circuit outputs the digital audio package number and the digital audio bit number to the audio playback adjusting circuit; and the audio playback adjusting circuit adjusts audio packages to be decoded by the digital audio media render according to the digital audio package number, and adjusts decoded audio bits generated by the digital audio media render according to the remaining digital audio bit number.

19. The digital audio media render of claim 15, wherein the control circuit controls the audio playback adjusting circuit according to the mismatching relative time position to adjust audio packages to be decoded by the digital audio media render and decoded audio bits generated by the digital audio media render.

20. The digital audio media render of claim 15, wherein the control circuit controls the audio playback adjusting circuit according to the mismatching relative time position to adjust decoded audio bits generated by the digital audio media render.

21. The digital audio media render of claim 15, wherein the control circuit updates an audio relative time position of the digital audio media render according to the mismatching relative time position.

\* \* \* \* \*